United States Patent
Issa et al.

(10) Patent No.: US 8,494,899 B2
(45) Date of Patent: Jul. 23, 2013

(54) DYNAMIC TALK RADIO PROGRAM SCHEDULING

(75) Inventors: Alfredo C. Issa, Apex, NC (US); Chris Amidon, Apex, NC (US); Gregory M. Evans, Raleigh, NC (US); Juan Pons, Pitsboro, NC (US)

(73) Assignee: Lemi Technology, LLC, Portsmouth, NH (US)

( * ) Notice: Subject to any disclaimer, the term of this patent is extended or adjusted under 35 U.S.C. 154(b) by 842 days.

(21) Appl. No.: 12/326,670

(22) Filed: Dec. 2, 2008

(65) Prior Publication Data

US 2012/0066038 A1 Mar. 15, 2012

(51) Int. Cl.
*G06Q 30/00* (2006.01)

(52) U.S. Cl.
USPC ..................................... 705/8; 705/9; 705/10

(58) Field of Classification Search
USPC .................................................. 705/8, 9, 10
See application file for complete search history.

(56) References Cited

U.S. PATENT DOCUMENTS

| | | |
|---|---|---|
| 3,291,919 A | 12/1966 | Robitaille |
| 4,682,370 A | 7/1987 | Matthews |
| 4,720,873 A | 1/1988 | Goodman et al. |
| 4,788,675 A | 11/1988 | Jones et al. |
| 4,920,432 A | 4/1990 | Eggers et al. |
| 5,119,188 A | 6/1992 | McCalley et al. |
| 5,127,003 A | 6/1992 | Doll, Jr. et al. |
| 5,129,036 A | 7/1992 | Dean et al. |
| 5,132,992 A | 7/1992 | Yurt et al. |
| 5,134,719 A | 7/1992 | Mankovitz |
| 5,168,481 A | 12/1992 | Culbertson et al. |
| 5,305,438 A | 4/1994 | MacKay et al. |
| 5,351,276 A | 9/1994 | Doll, Jr. et al. |
| 5,396,417 A | 3/1995 | Burks et al. |
| 5,414,455 A | 5/1995 | Hooper et al. |
| 5,442,701 A | 8/1995 | Guillou et al. |
| 5,455,570 A | 10/1995 | Cook et al. |
| 5,526,284 A | 6/1996 | Mankovitz |
| 5,539,635 A | 7/1996 | Larson, Jr. |
| 5,557,541 A | 9/1996 | Schulhof et al. |
| 5,572,442 A | 11/1996 | Schulhof et al. |
| 5,592,511 A | 1/1997 | Schoen et al. |
| 5,617,565 A | 4/1997 | Augenbraun et al. |
| 5,629,867 A | 5/1997 | Goldman |
| 5,706,427 A | 1/1998 | Tabuki |

(Continued)

FOREIGN PATENT DOCUMENTS

| | | |
|---|---|---|
| EP | 0672991 B1 | 5/1998 |
| EP | 0952732 A2 | 10/1999 |

(Continued)

OTHER PUBLICATIONS

Free Online Radio—Internet Talk Radio, BlogTalkRadio, http://www.blogtalkradio.com, Sep. 28, 2008, pp. 1-2.

(Continued)

*Primary Examiner* — Nga B. Nguyen (57) ABSTRACT

Methods and systems for dynamically scheduling a talk radio program include registering potential participants of a talk radio program service and receiving participant preferences for each of the potential participants, wherein the participant preferences include at least one topic of interest and a time availability; scheduling a talk radio program for production when a combination the participant preferences reach predetermined thresholds; and sending the potential participants a notification of the scheduling of the talk radio program.

28 Claims, 6 Drawing Sheets

U.S. PATENT DOCUMENTS

| | | | |
|---|---|---|---|
| 5,721,827 A | 2/1998 | Logan et al. |
| 5,732,216 A | 3/1998 | Logan et al. |
| 5,734,893 A | 3/1998 | Li et al. |
| 5,758,257 A | 5/1998 | Herz et al. |
| 5,790,935 A | 8/1998 | Payton |
| 5,809,246 A | 9/1998 | Goldman |
| 5,815,662 A | 9/1998 | Ong |
| 5,818,510 A | 10/1998 | Cobbley et al. |
| 5,819,160 A | 10/1998 | Foladare et al. |
| 5,819,273 A | 10/1998 | Vora et al. |
| 5,852,610 A | 12/1998 | Olaniyan |
| 5,855,015 A | 12/1998 | Shoham |
| 5,857,149 A | 1/1999 | Suzuki |
| 5,864,682 A | 1/1999 | Porter et al. |
| 5,907,831 A | 5/1999 | Lotvin et al. |
| 5,920,856 A | 7/1999 | Syeda-Mahmood |
| 5,926,624 A | 7/1999 | Katz et al. |
| 5,943,422 A | 8/1999 | Van Wie et al. |
| 5,949,492 A | 9/1999 | Mankovitz |
| 5,953,005 A | 9/1999 | Liu |
| 5,956,716 A | 9/1999 | Kenner et al. |
| 5,973,724 A | 10/1999 | Riddle |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 6,006,225 A | 12/1999 | Bowman et al. |
| 6,009,422 A | 12/1999 | Ciccarelli |
| 6,014,569 A | 1/2000 | Bottum |
| 6,018,768 A | 1/2000 | Ullman et al. |
| 6,029,165 A | 2/2000 | Gable |
| 6,038,591 A | 3/2000 | Wolfe et al. |
| 6,055,566 A | 4/2000 | Kikinis |
| 6,060,997 A | 5/2000 | Taubenheim et al. |
| 6,067,562 A | 5/2000 | Goldman |
| 6,081,780 A | 6/2000 | Lumelsky |
| 6,081,830 A | 6/2000 | Schindler |
| 6,088,455 A | 7/2000 | Logan et al. |
| 6,088,722 A | 7/2000 | Herz et al. |
| 6,093,880 A | 7/2000 | Arnalds |
| 6,108,686 A | 8/2000 | Williams, Jr. |
| 6,122,757 A | 9/2000 | Kelley |
| 6,125,387 A | 9/2000 | Simonoff et al. |
| 6,128,663 A | 10/2000 | Thomas |
| 6,144,375 A | 11/2000 | Jain et al. |
| 6,161,142 A | 12/2000 | Wolfe et al. |
| 6,167,393 A | 12/2000 | Davis, III et al. |
| 6,169,573 B1 | 1/2001 | Sampath-Kumar et al. |
| 6,182,128 B1 | 1/2001 | Kelkar et al. |
| 6,199,076 B1 | 3/2001 | Logan et al. |
| 6,223,210 B1 | 4/2001 | Hickey |
| 6,226,672 B1 | 5/2001 | DeMartin et al. |
| 6,229,621 B1 | 5/2001 | Kulakowski et al. |
| 6,233,682 B1 | 5/2001 | Fritsch |
| 6,246,672 B1 | 6/2001 | Lumelsky |
| 6,248,946 B1 | 6/2001 | Dwek |
| 6,253,069 B1 | 6/2001 | Mankovitz |
| 6,263,507 B1 | 7/2001 | Ahmad et al. |
| 6,289,165 B1 | 9/2001 | Abecassis |
| 6,292,786 B1 | 9/2001 | Deaton et al. |
| 6,295,555 B1 | 9/2001 | Goldman |
| 6,311,194 B1 | 10/2001 | Sheth et al. |
| 6,314,094 B1 | 11/2001 | Boys |
| 6,317,784 B1 | 11/2001 | Mackintosh et al. |
| 6,334,127 B1 | 12/2001 | Bieganski et al. |
| 6,335,927 B1 | 1/2002 | Elliott et al. |
| 6,338,044 B1 | 1/2002 | Cook et al. |
| 6,339,693 B1 | 1/2002 | Chan |
| 6,344,607 B2 | 2/2002 | Cliff |
| 6,345,289 B1 | 2/2002 | Lotspiech et al. |
| 6,349,329 B1 | 2/2002 | Mackintosh et al. |
| 6,349,339 B1 | 2/2002 | Williams |
| 6,351,733 B1 | 2/2002 | Saunders et al. |
| 6,377,782 B1 | 4/2002 | Bishop et al. |
| 6,385,596 B1 | 5/2002 | Wiser et al. |
| 6,389,467 B1 | 5/2002 | Eyal |
| 6,411,992 B1 | 6/2002 | Srinivasan et al. |
| 6,415,282 B1 | 7/2002 | Mukherjea et al. |
| 6,438,579 B1 | 8/2002 | Hosken |
| 6,473,792 B1 | 10/2002 | Yavitz et al. |
| 6,477,707 B1 | 11/2002 | King et al. |
| 6,484,199 B2 | 11/2002 | Eyal |
| 6,487,390 B1 | 11/2002 | Virine et al. |
| 6,496,802 B1 | 12/2002 | van Zoest et al. |
| 6,502,194 B1 | 12/2002 | Berman et al. |
| 6,505,123 B1 | 1/2003 | Root et al. |
| 6,519,648 B1 | 2/2003 | Eyal |
| 6,546,555 B1 | 4/2003 | Hjelsvold et al. |
| 6,560,651 B2 | 5/2003 | Katz et al. |
| 6,581,103 B1 | 6/2003 | Dengler |
| 6,587,127 B1 | 7/2003 | Leeke et al. |
| 6,600,898 B1 | 7/2003 | De Bonet et al. |
| 6,609,096 B1 | 8/2003 | De Bonet et al. |
| 6,615,039 B1 | 9/2003 | Eldering |
| 6,628,928 B1 | 9/2003 | Crosby et al. |
| 6,662,231 B1 | 12/2003 | Drosset et al. |
| 6,670,537 B2 | 12/2003 | Hughes et al. |
| 6,684,249 B1 | 1/2004 | Frerichs et al. |
| 6,697,824 B1 | 2/2004 | Bowman-Amuah |
| 6,701,355 B1 | 3/2004 | Brandt et al. |
| 6,711,622 B1 | 3/2004 | Fuller et al. |
| 6,721,741 B1 | 4/2004 | Eyal et al. |
| 6,725,275 B2 | 4/2004 | Eyal |
| 6,735,628 B2 | 5/2004 | Eyal |
| 6,741,869 B1 | 5/2004 | Lehr |
| 6,748,237 B1 | 6/2004 | Bates et al. |
| 6,772,127 B2 | 8/2004 | Saunders et al. |
| 6,792,470 B2 | 9/2004 | Hakenberg et al. |
| 6,793,142 B2 | 9/2004 | Yap |
| 6,823,225 B1 | 11/2004 | Sass |
| 6,879,963 B1 | 4/2005 | Rosenberg |
| 6,882,641 B1 | 4/2005 | Gallick et al. |
| 6,925,489 B1 | 8/2005 | Curtin |
| 6,981,040 B1 | 12/2005 | Konig et al. |
| 6,985,694 B1 | 1/2006 | De Bonet et al. |
| 6,999,783 B2 | 2/2006 | Toyryla et al. |
| 7,010,263 B1 | 3/2006 | Patsiokas |
| 7,010,537 B2 | 3/2006 | Eyal et al. |
| 7,010,613 B2 | 3/2006 | Connor |
| 7,028,082 B1 | 4/2006 | Rosenberg et al. |
| 7,031,931 B1 | 4/2006 | Meyers |
| 7,035,871 B2 | 4/2006 | Hunt et al. |
| 7,058,694 B1 | 6/2006 | De Bonet et al. |
| 7,061,482 B2 | 6/2006 | Ferris |
| 7,072,309 B2 | 7/2006 | Xie et al. |
| 7,079,807 B1 | 7/2006 | Daum et al. |
| 7,102,067 B2 | 9/2006 | Gang et al. |
| 7,133,924 B1 | 11/2006 | Rosenberg et al. |
| 7,139,770 B2 | 11/2006 | Nakase et al. |
| 7,149,983 B1 | 12/2006 | Robertson et al. |
| 7,171,491 B1 | 1/2007 | O'Toole et al. |
| 7,203,838 B1 | 4/2007 | Glazer et al. |
| 7,206,838 B2 | 4/2007 | Boyd et al. |
| 7,277,955 B2 | 10/2007 | Elliott |
| 7,343,141 B2 | 3/2008 | Ellis et al. |
| 7,468,934 B1 | 12/2008 | Janik |
| 7,469,283 B2 | 12/2008 | Eyal et al. |
| 7,577,665 B2 | 8/2009 | Ramer et al. |
| 7,680,959 B2 | 3/2010 | Svendsen |
| 7,711,838 B1 | 5/2010 | Boulter et al. |
| 7,765,192 B2 | 7/2010 | Svendsen |
| 7,783,722 B1 | 8/2010 | Rosenberg et al. |
| 7,797,272 B2 | 9/2010 | Picker et al. |
| 7,797,321 B2 | 9/2010 | Martin et al. |
| 7,827,110 B1 | 11/2010 | Wieder |
| 7,827,236 B2 | 11/2010 | Ferris |
| 7,840,691 B1 | 11/2010 | De Bonet et al. |
| 7,853,622 B1 | 12/2010 | Baluja et al. |
| 7,856,485 B2 | 12/2010 | Prager et al. |
| 7,870,088 B1 | 1/2011 | Chen et al. |
| 7,904,505 B2 * | 3/2011 | Rakers et al. ................ 709/203 |
| 7,917,645 B2 | 3/2011 | Ikezoye et al. |
| 7,917,932 B2 | 3/2011 | Krikorian |
| 7,926,085 B2 | 4/2011 | Del Beccaro et al. |
| 8,045,952 B2 | 10/2011 | Qureshey et al. |
| 8,050,652 B2 | 11/2011 | Qureshey et al. |
| 8,060,525 B2 | 11/2011 | Svendsen et al. |

| | | |
|---|---|---|
| 8,117,193 B2 | 2/2012 | Svendsen et al. |
| 2001/0025259 A1 | 9/2001 | Rouchon |
| 2001/0051852 A1 | 12/2001 | Sundaravel et al. |
| 2002/0002039 A1 | 1/2002 | Qureshey et al. |
| 2002/0010759 A1 | 1/2002 | Hitson et al. |
| 2002/0023084 A1 | 2/2002 | Eyal et al. |
| 2002/0023270 A1 | 2/2002 | Thomas et al. |
| 2002/0035616 A1 | 3/2002 | Diamond et al. |
| 2002/0053078 A1* | 5/2002 | Holtz et al. .................. 725/14 |
| 2002/0072326 A1 | 6/2002 | Qureshey et al. |
| 2002/0116082 A1 | 8/2002 | Gudorf |
| 2002/0116476 A1 | 8/2002 | Eyal et al. |
| 2002/0161858 A1 | 10/2002 | Goldman |
| 2002/0165912 A1 | 11/2002 | Wenocur et al. |
| 2002/0183059 A1 | 12/2002 | Noreen et al. |
| 2002/0199001 A1 | 12/2002 | Wenocur et al. |
| 2003/0018799 A1 | 1/2003 | Eyal |
| 2003/0033420 A1 | 2/2003 | Eyal et al. |
| 2003/0041110 A1 | 2/2003 | Wenocur et al. |
| 2003/0103644 A1 | 6/2003 | Klayh |
| 2003/0137531 A1 | 7/2003 | Katinsky et al. |
| 2004/0006634 A1 | 1/2004 | Ferris |
| 2004/0019497 A1 | 1/2004 | Volk et al. |
| 2004/0186733 A1 | 9/2004 | Loomis et al. |
| 2004/0199494 A1 | 10/2004 | Bhatt |
| 2004/0255340 A1 | 12/2004 | Logan |
| 2005/0021470 A1 | 1/2005 | Martin et al. |
| 2005/0044561 A1 | 2/2005 | McDonald |
| 2005/0198233 A1 | 9/2005 | Manchester et al. |
| 2005/0278380 A1 | 12/2005 | Ferris |
| 2006/0026147 A1 | 2/2006 | Cone et al. |
| 2006/0072724 A1 | 4/2006 | Cohen et al. |
| 2006/0101003 A1 | 5/2006 | Carson et al. |
| 2006/0143236 A1 | 6/2006 | Wu |
| 2006/0171395 A1 | 8/2006 | Deshpande |
| 2006/0195442 A1 | 8/2006 | Cone et al. |
| 2006/0288074 A1 | 12/2006 | Rosenberg |
| 2007/0061301 A1 | 3/2007 | Ramer et al. |
| 2007/0078660 A1 | 4/2007 | Ferris |
| 2007/0078708 A1 | 4/2007 | Yu et al. |
| 2007/0078709 A1 | 4/2007 | Rajaram |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0156647 A1 | 7/2007 | Shen et al. |
| 2007/0156897 A1 | 7/2007 | Lim |
| 2007/0180063 A1 | 8/2007 | Qureshey et al. |
| 2007/0265979 A1 | 11/2007 | Hangartner |
| 2007/0266031 A1 | 11/2007 | Adams et al. |
| 2007/0282949 A1 | 12/2007 | Fischer et al. |
| 2007/0283268 A1 | 12/2007 | Berger et al. |
| 2007/0286169 A1* | 12/2007 | Roman .................. 370/352 |
| 2008/0016205 A1 | 1/2008 | Svendsen |
| 2008/0031433 A1* | 2/2008 | Sapp et al. .................. 379/92.03 |
| 2008/0052380 A1 | 2/2008 | Morita et al. |
| 2008/0085769 A1 | 4/2008 | Lutnick et al. |
| 2008/0208820 A1 | 8/2008 | Usey et al. |
| 2008/0209013 A1 | 8/2008 | Weel |
| 2008/0243733 A1 | 10/2008 | Black |
| 2009/0013347 A1 | 1/2009 | Ahanger et al. |
| 2009/0061763 A1 | 3/2009 | Dillon et al. |
| 2009/0063645 A1 | 3/2009 | Casey et al. |
| 2009/0064029 A1 | 3/2009 | Corkran et al. |
| 2009/0070267 A9 | 3/2009 | Hangartner |
| 2009/0077041 A1 | 3/2009 | Eyal et al. |
| 2009/0093300 A1 | 4/2009 | Lutnick et al. |
| 2009/0158146 A1 | 6/2009 | Curtis et al. |
| 2009/0164429 A1 | 6/2009 | Svendsen et al. |
| 2009/0164448 A1 | 6/2009 | Curtis |
| 2009/0198666 A1 | 8/2009 | Winston et al. |
| 2010/0017455 A1 | 1/2010 | Svendsen et al. |
| 2010/0185732 A1 | 7/2010 | Hyman |
| 2011/0016483 A1 | 1/2011 | Opdycke |
| 2011/0034121 A1 | 2/2011 | Ng et al. |
| 2012/0042094 A1 | 2/2012 | Qureshey et al. |
| 2012/0042337 A1 | 2/2012 | De Bonet et al. |
| 2012/0072418 A1 | 3/2012 | Svendsen et al. |
| 2012/0143729 A1 | 6/2012 | Qureshey et al. |

FOREIGN PATENT DOCUMENTS

| | | |
|---|---|---|
| EP | 0984584 A1 | 3/2000 |
| GB | 2306869 A | 5/1997 |
| GB | 2397205 A | 7/2004 |
| WO | 97/26601 A2 | 7/1997 |
| WO | 2007041369 | 4/2007 |
| WO | 2007041370 | 4/2007 |
| WO | WO 2007/041369 | 4/2007 |
| WO | WO 2007/041370 | 4/2007 |

OTHER PUBLICATIONS

Free Internet Radio—Social Broadcasting, BlogTalkRadio, http://www.blogtalkradio.com/whatis.aspx, Sep. 28, 2008, pp. 1-2.

TalkZone: Internet Talk Radio—Internet Talk Shows—Internet Radio, http://www.talkzone.com/zonehome.asp, Jan. 29, 2009, pp. 1-2.

"About Intermind's Channel Communications Patents," downloaded from <http://www.intermind.com/materials/patent_desc.html> on Feb. 27, 1998, 5 pages.

"About.com: http://quintura.com/," at <http://websearch.about.com/gi/dynamic/offsite.htm?zi=1/XJ&sdn=web...f=10&su=p284.8.150.ip_&tt=13&bt=0&bts=0&zu=http%3A//quintura.com/>, copyright 2007, Quintura Inc., printed Oct. 17, 2007, 2 pages.

Aguilera, M.K. and Strom, R.E., "Efficient Atomic Broadcast Using Deterministic Merge," Proceedings of ACM Symposium on Principles of Distributed Computing (PODC), Jul. 16-19, 2000, copyright 2000, ACM, New York, New York, 10 pages.

"anthony.liekens.net>> Music>> Cloud," at <http://anthony.liekens.net/index.php/Music/Cloud>, page last modified on Apr. 12, 2007, copyright 2000-2006, Anthony Liekens, printed Oct. 17, 2007, 4 pages.

"AOL Music Now," at <http://web.archive.org/web/20060508184531/aol.musicnow.com/az/home.jhtml?_requesti...>, copyright 2006, AOL Music Now LLC, printed Nov. 16, 2007, 1 page.

"Apple—iPod + iTunes," at <http://www.apple.com/itunes/>, printed Feb. 7, 2007, 2 pages.

Boswell, Wendy, "Loading 'Quintura—Search With Quintura, a Tag Cloud Search Engine'," at <http://websearch.about.com/od/dailywebsearchtips/qt/dnt0830.htm?p=1>, copyright 2007, About.com, Inc., printed Oct. 17, 2007, 1 page.

Egyhazy et al., "Intelligent Web Search Agents," at <http://csgrad.cs.vt.edu/~tplunket/article.html>, pp. 1-23, printed Dec. 20, 1999, 23 pages.

"FAQ," at <http://blog.pandora.com/faq/>, copyright 2005-2006, Pandora Media, Inc., printed Aug. 8, 2006, 20 pages.

"Frequently Asked Questions about Intermind's Patents," downloaded from <http://www.intermind.com/materials/ patent_faq.html> on Feb. 27, 1998, 9 pages.

Gibbon, John F. et al., "The Use of Network Delay Estimation for Multimedia Data Retrieval," IEEE Journal on Selected Areas in Communications, vol. 14, No. 7, Sep. 1996, pp. 1376-1387, 12 pages.

Hearst, Marti A. et al., "Tag Clouds: Data Analysis Tool or Social Signaller?," Proceedings of the 41st Annual Hawaii International Conference on System Sciences (HICSS 2008), Jan. 7-10, 2008, Waikoloa, Big Island, Hawaii, p. 160, available from <http://csdl2.computer.org/persagen/DLAbsToc.jsp?resourcePath=/dl/proceedings/&toc=comp/proceedings/hicss/2008/3075/00/3075toc.xml&DOI=10.1109/HICSS.2008.422>, 10 pages.

Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

Huhn, Mary, "Fed Up With Radio? Create Your Own Online Station," New York Post, at <http://pqasb.pqarchiver.com/nypost/access/68457933.html?FMT=FT&di. . .>, Nov. 22, 1998, printed Oct. 13, 2009, 2 pages.

"InferNote is an exploration tool for your music collection," at <http://www.itweaks.com/infdoc/index.html>, copyright 2004, otherslikeyou.com Inc., printed Feb. 7, 2007, 13 pages.

"Intermind Announces Approval of First Patent Application," dated Oct. 7, 1997, downloaded from <http://www.intermind.com/inside/press_rel/100797_allow.html>, 3 pages.

International Search Report for PCT/GB01/03069 mailed Oct. 11, 2002, 3 pages.

Kaplan, Marc A., "IBM Cryptolopes TM, SuperDistribution and Digital Rights Management," found at <http://www.research.ibm.com/people/k/kaplan/cryptolope-docs/crypap.html> from the Internet Archive, copyright Dec. 30, 1996, IBM Corporation, printed Mar. 15, 2000, 7 pages.

Krigel, Beth Lipton, "Imagine Radio spinning off," CNET News, at <http://news.cnet.com/Imagine-Radio-spinning-off/2100-1033_3-213613.html>, Jul. 22, 1998, printed Oct. 13, 2009, 3 pages.

Krigel, Beth Lipton, "Radio features at center of Net law," CNET News, at <http://news.cnet.com/Radio-features-at-center-of-Net-law/2100-1033_3-214752.html>, Aug. 24, 1998, printed Oct. 15, 2009, 2 pages.

Lamantia, Joe, "Second Generation Tag Clouds," Feb. 23, 2006, at <http://www.joelamantia.com/blog/archives/ideas/second_generation_tag_clouds.html>, copyright 2006, Joe Lamantia, printed Nov. 29, 2007, 19 pages.

Lehmann-Haupt, Rachel, "Library/internet Radio; Listeners Take on Role of the Deejay," The New York Times, at <http://www.nytimes.com/1998/11/05/technology/library-internet-radio-lis. . .>, Nov. 5, 1998, printed Oct. 13, 2009, 2 pages.

Lehmann-Haupt, Rachel, "Library/Internet Radio; On Spinner, Wide Range of Choices," The New York Times, at <http://www.nytimes.com/1998/11/05/technology/library-internet-radio-on-spinner-wide-range-of-choices.html?scp=1&sq=0n . . .>, Nov. 5, 1998, printed Oct. 15, 2009, 5 pages.

Lehmann-Haupt, Rachel, "Library/internet Radio; Web Radio Expands Listening Horizons," The New York Times, at <http://www.nytimes.com/1998/11/05/technology/library-internet-radio-web-radio-expands-listening-horizons.html?scp=2&sq= . . .>, Nov. 5, 1998, printed Oct. 15, 2009, 5 pages.

Lingnau et al., "An HTTP-based Infrastructure for Mobile Agents," at <http://www.w3.org/Conferences/WWW4/Papers/150/>, 1995, pp. 1-15, printed Dec. 20, 1999, 15 pages.

Madan, Sameer, "Search the Web without a headache," PC World (India), pp. 40-41, Feb. 1998, printed Dec. 20, 1999, 2 pages.

Merkel, Oliver et al., "Protecting VoD the Easier Way," Proceedings of the sixth ACM International Conference on Multimedia, Sep. 13-16, 1998, Bristol, United Kingdom, 1998, pp. 21-28, 8 pages.

"Music Artist Cloud," at <http://artistcloud.camaris.be/>, copyright 2007, mac, printed Oct. 17, 2007, 2 pages.

Nickell, Joe Ashbrook, "Roll Your Own Radio," at <http://www.wired.com/print/culture/lifestyle/news/1998/08/14706>, Aug. 28, 1998, printed Oct. 13, 2009, 1 page.

"Pandora Internet Radio—Find New Music, Listen to Free Web Radio," at <http://www.pandora.com/>, copyright 2005-2007, Pandora Media, Inc., printed Feb. 7, 2007, 1 page.

"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.

Rouarch, Pierre, "The Cloud Search Beta," at <http://www.itcom3.com/thecloudsearch/aboutthecloudsearch.php>, copyright 2007, Pierre Rouarch, printed Oct. 17, 2007, 2 pages.

Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm>, copyright 1996, Seybold Publications Inc., 9 pages.

"Start Listening with Last.fm," at <http://www.last.fm/>, date unknown, 1 page.

"Tag cloud in standalone player—Feedback and Ideas—Last.fm," at <http://www.last.fm/forum/21717/_/333289>, posting dated Oct. 4, 2007,copyright 2002-2007, Last.fm Ltd., printed Oct. 17, 2007, 2 pages.

"YouTube—Broadcast Yourself.," at <http://www.youtube.com/>, copyright 2007, YouTube, LLC, printed Oct. 26, 2007, 2 pages.

"Master's Projects of the KR&R Group," Faculty of Sciences, Vrije Universiteit, Amsterdam, URL unknown, publication date unknown, obtained on or prior to Apr. 22, 2009, 7 pages.

"Pandora—Frequently Asked Questions," from <http:www.pandora.com>, obtained on or prior to Apr. 22, 2009, copyright 2005-2009, Pandora Media, Inc., 48 pages.

"Searching and Browsing Radio Time," URL unknown, publication date unknown, obtained on or prior to Apr. 22, 2009, 3 pages.

"TalkStreamLive.com—A Dynamic Directory of Streaming Radio," at <http://www.talkstreamlive.com/aboutus.aspx>, from the Internet Archive, dated Aug. 1, 2008, copyright 2006-2008; 3 pages.

Hochmair, H.H. et al., "User Interface Design for Semantic Query Expansion in Geo-data Repositories," Angewandte Geoinformatik 2006—Beitrage zum 18, AGIT-Symposium Salzburg: Heidelberg: Wichmann, 2006, 10 pages.

"Welcome to Internet Talk Radio from Talkzone.com," at <http://www.talkzone.com/> from the Internet Archive, dated Jul. 19, 2008, copyright 2007-2008, Syndication Networks Corp., 2 pages.

"What is BlogTalkRadio," at <http://www.blogtalkradio.com/whatis.aspx> from the Internet Archive, dated Feb. 28, 2009, copyright 2009, appears that it may have existed in 2008, BlogTalkRadio.com, 2 pages.

* cited by examiner

DYNAMIC TALK RADIO PROGRAM SCHEDULING

BACKGROUND OF THE INVENTION

With the popularity of MP3 type music players and smart mobile phones, talk radio programming for both terrestrial and Internet radio is expected to grow as an alternative to current levels of music content and associated royalties. Specifically, with Internet radio, small listener audience talk radio is beginning to emerge, allowing low-cost entry of hosts and radio shows into the market. These small radio shows may begin to mimic followings much like blogs and YouTube™. New business models (primarily advertisement based) are beginning to emerge to monetize consumption of this self-generated content. For example, revenue from Internet talk radio advertising has been forecasted to grow from approximately $200 million in 2006 to over $19 million in 2020.

While providing advertisement based radio programs may appear to be lucrative, putting together many such small talk radio shows in terms of determining relevant topics, and coordinating and scheduling the necessary combination of guests, hosts, and advertisers, may be cost prohibitive for many terrestrial and Internet radio stations.

BRIEF SUMMARY OF THE INVENTION

Exemplary embodiments provide methods and systems for dynamically scheduling a talk radio program. Aspects of the exemplary embodiment include: registering potential participants of a talk radio program service and receiving participant preferences for each of the potential participants, wherein the participant preferences include at least one topic of interest and a time availability; scheduling a talk radio program for production when a combination of the participant preferences reach predetermined thresholds; and sending the potential participants a notification of the scheduling of the talk radio program.

DETAILED DESCRIPTION OF THE INVENTION

The present invention relates to dynamic talk radio program scheduling. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiments provide methods and systems for providing dynamic talk radio program scheduling for Internet radio and/or terrestrial radio. A service is provided whereby potential listeners, potential guests, potential hosts, and/or potential advertisers may be combined dynamically on-the-fly to schedule a talk radio program by leveraging resource parameters including topic and time availability preferences of the potential listeners, potential guests, potential hosts, and/or potential advertisers. Other resource parameters such as costs also may be utilized to determine the scheduling of a dynamic talk radio program.

Figure 1:
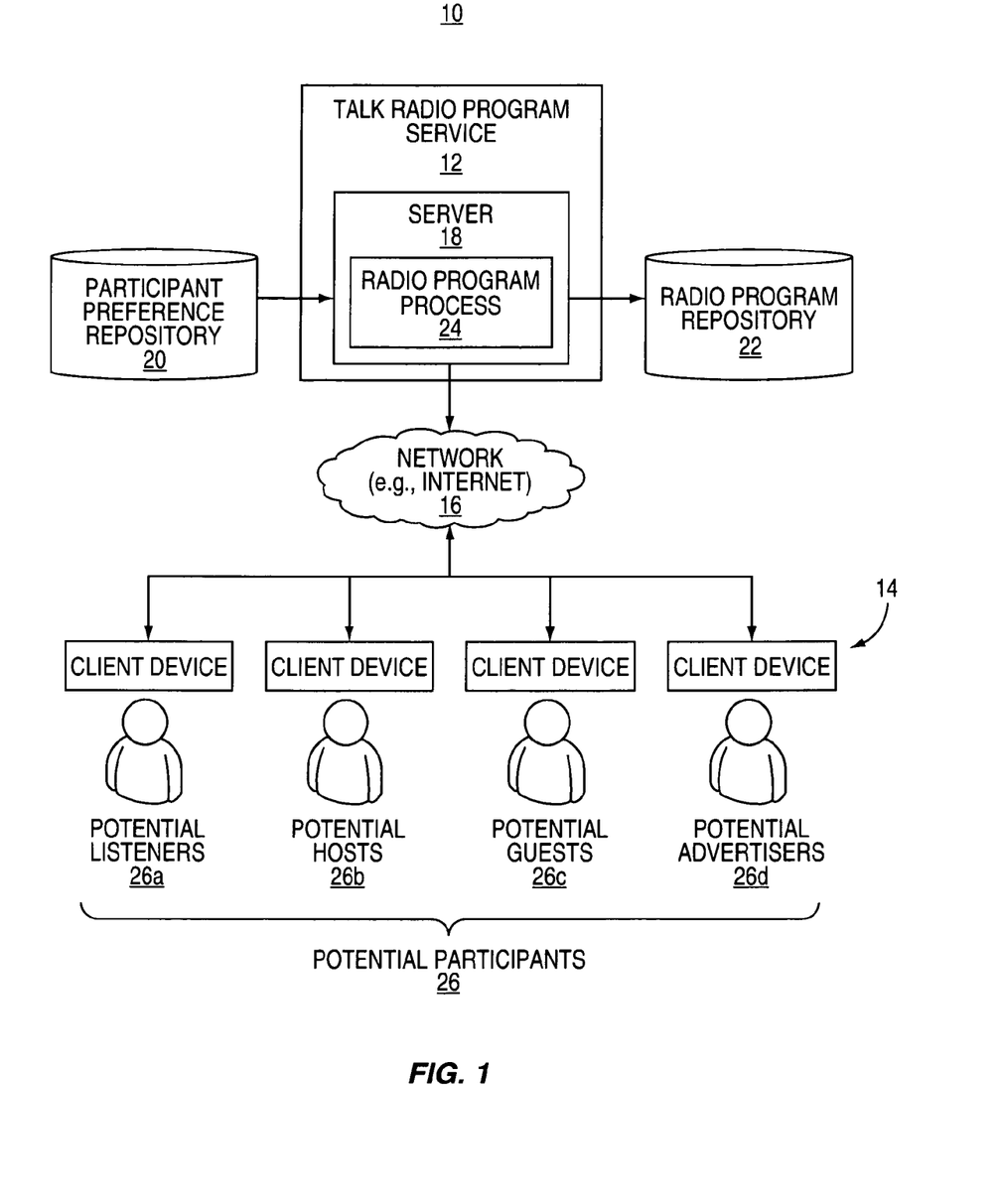
FIG. 1 is a diagram illustrating a system for scheduling a talk radio program.

FIG. 1 is a diagram illustrating a system for scheduling a talk radio program. The system 10 includes a talk radio program service 12 that may communicate with any one of a number of client devices 14 over a wired or wireless interface to a network 16, such as the Internet. The talk radio program service 12 may include a server 18, a participant preference repository 20 and a radio program repository 22; and the server 18 may execute a radio program process 24.

In operation, potential participants 26 of the talk radio program service 12 access the server 18 via one of the client devices 14. In one embodiment, each of the client devices 14 comprises one or more types of electronic devices executing one or more types of browser applications. Example types of client devices 14 may include a computer and a smart phone. Other examples may include communication-equipped MP3 players and a personal digital assistant (PDA), for instance. At least a portion of the electronic devices may include a media player application (not shown) that may be capable of playing digital audio content, such as for listening to talk radio programs created as a result of the talk radio program service 12.

According to one embodiment, different types of potential participants 26 may include any of potential listeners 26a, potential hosts 26b, potential guests 26c, and/or potential advertisers 26d that may participate in one or more talk radio programs. According to the exemplary embodiment, the radio program process 24 automatically aggregates different combinations of the potential listeners 26a, potential hosts 26b, potential guests 26c, and/or potential advertisers 26d based on resource parameters, such as preference information supplied by the potential participants 26, to dynamically schedule talk radio programs.

Although in an exemplary embodiment, the radio program process 24 is shown as a single component executing on a single server 18, the radio program process 24 may be implemented as a number of components that may execute on any number of servers or computers.

Figure 2:
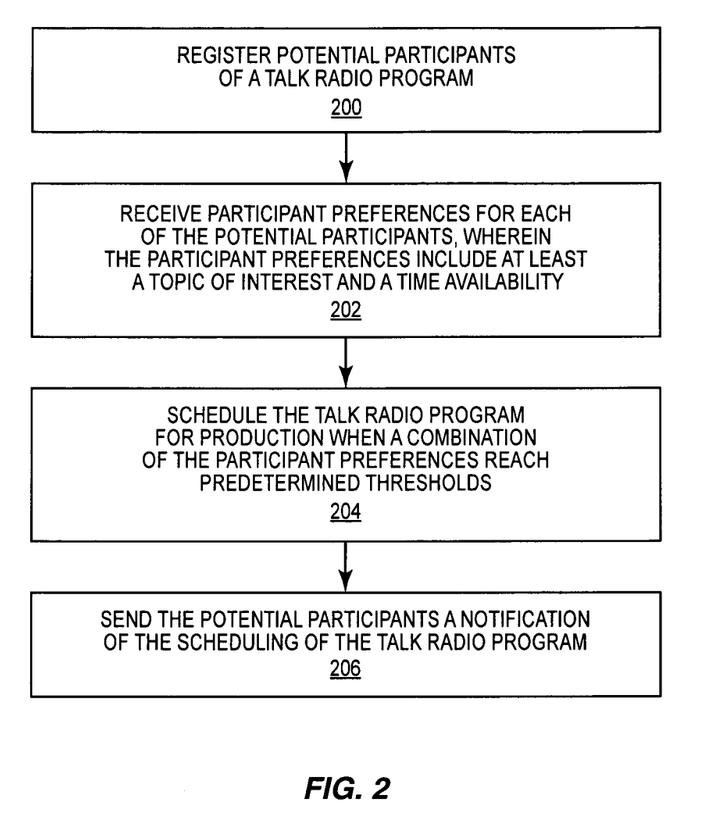
FIG. 2 is a flow diagram illustrating a process for scheduling a talk radio program.

FIG. 2 is a flow diagram illustrating a process for scheduling a talk radio program, which may be performed by the radio program process 24. The process may include registering potential participants 26 of the talk radio program service 12 (block 200). In one embodiment, participant registration may be limited to the potential listeners 26a. However, in another embodiment, the participant registration may further require at least one of the potential hosts 26b, the potential guests 26c, and/or the potential advertisers 26d. In one embodiment, each of the potential participants 26 may register with the talk radio program service 12 by accessing a registration page provided by server 18 via a browser on the client device 14.

The radio program process 24 receives participant preferences for each of the potential participants 26, wherein the participant preferences include at least one topic of interest and a time availability (block 202). The radio program process 24 may then store the participant preferences for each of the potential participants 26 in the participant preference repository 20. In one embodiment, the potential participants 26 may provide their participant preferences to the talk radio program service 12 via a client application or via a browser. The radio program process 24 may receive the participant preferences at the time of registration and/or after registration.

The radio program process 24 schedules a talk radio program for production when a combination of the participant preferences reach predetermined thresholds (block 204). In one embodiment, the participant preferences may include the time availability of any of the potential participants 26, including the potential listeners 26a, the potential hosts 26b, the potential guests 26c, and/or sponsorship by the potential advertisers 26d. During scheduling, the talk radio program may be assigned a topic of interest during a particular time based on the time availability of any of the potential participants 26. For instance, an example of the participant preferences reaching predetermined thresholds may result in the talk radio program being scheduled when a particular topic of interest has been selected by a predetermined number of the potential participants during a particular time availability. The predetermined number of potential participants may depend on the type of radio program being scheduled, but may include a minimum number of participants or a highest number of participants associated with a particular topic during a particular time period when compared with other topics during the same or similar time period. The predetermined number of potential participants may also be specified with an actual number or range of numbers, e.g., 25 or more, for example.

In one embodiment, the radio talk program may be scheduled for production when resource parameters comprise one or more predetermined values. In one embodiment, the resource parameters may include the participant preferences and at least one of advertisement revenue generated from sponsorship by at least one of the potential advertisers 26d, and costs of the talk radio program, including any desired fees for the potential host(s) 26b and guest(s) 26c to participate in the talk radio program.

As used herein, scheduling of the talk radio program may include specifying the topic assigned to the talk radio program, the potential participants 26 of the talk radio program and proposing one or more dates and times for conducting the talk radio program. In one embodiment, such elements selected for inclusion into the talk radio program may be stored in the radio program repository 22.

After the talk radio program has been scheduled, the radio program process 24 sends the potential participants 26 a notification of the scheduling of the talk radio program (block 206). In one embodiment, not all of the potential participants 26 of the talk radio program service 12 are sent the notification, just the potential participants 26 determined to be available to participate in the talk radio program. The content of the notification may be different for each type of potential participant 26. For example, the notification sent to potential listeners 26a may include information about the talk radio program and may invite the potential listeners 26a to tune in. Only once potential listeners 26a tune-in to the talk radio program do they become actual listeners. The notification sent to the host(s) 26b and guest(s) 26c may include not only the information about talk radio program, but also contact information of the people in charge at the radio program service hosting the talk radio program, talking points, potential listener demographic information, and the like.

Figure 3A:
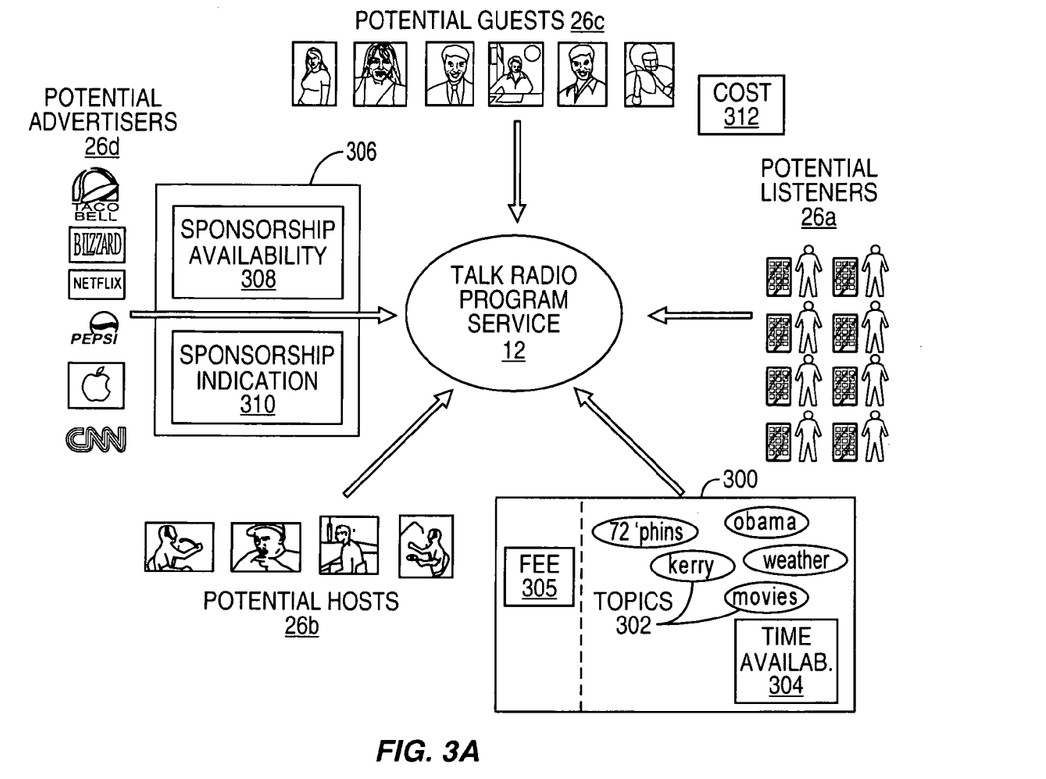
FIGS. 3A and 3B are block diagrams graphically illustrating an example operation of the system shown in FIG. 1.
Figure 3B:
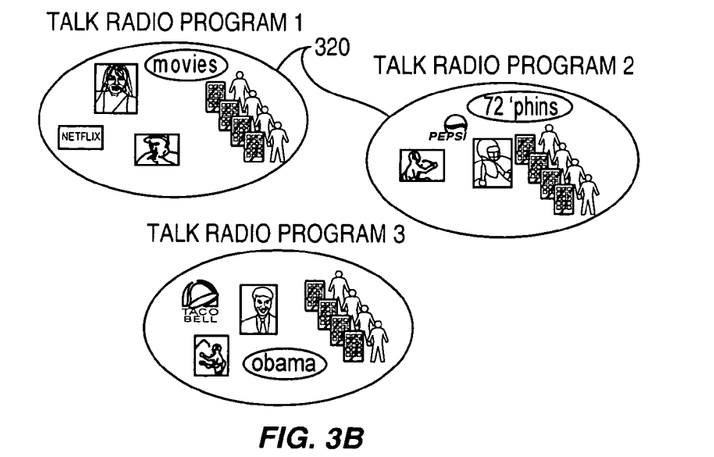

FIGS. 3A and 3B are block diagrams graphically illustrating an example operation of the system shown in FIG. 1. FIG. 3A shows various potential participants and resource parameter inputs to the talk radio program service 12 that may be considered when scheduling a dynamic talk radio program. The potential participants may include any of the potential listeners 26a, the potential hosts 26b, the potential guests 26c, and the potential advertisers 26d. The resource parameters may include participant preferences 300 of each of the registered potential listeners 26a, the potential hosts 26b and the potential guests 26c in the form of topics of interest 302 and time availability 304 for participating in a talk radio program. For the potential hosts 26b and the potential guests 26c, the participant preferences 300 may further include a desired fee 305.

In one embodiment, the registration by potential advertisers 26d may be optional. However, in the embodiment where the potential advertisers 26d do register with the talk radio program service 12, the resource parameters may also include advertiser participant preferences 306 for each advertiser 26d in the form of sponsorship availability 308, and a sponsorship indication 310 for each talk radio program the advertiser wishes to sponsor. The sponsorship availability 308 may indicate a potential advertiser's 26d availability to sponsor a talk radio program. And the sponsorship indication 310 may indicate that the potential advertiser 26d has signed up to sponsor the talk radio program and is now an actual advertiser.

The resource parameters may further include a cost 312 of each talk radio program being considered. The cost 312 may be a minimum fee set by the talk radio program service 12 for each talk radio program that is necessary to cover the fee 305, a service overhead, and any service fees. The foregoing is not intended be an exhaustive list of the resource parameters, just examples, as there may be others as well, such as location, demographics, and the like.

FIG. 3B shows the result of the talk radio program service 12 aggregating the participants into talk radio programs based on the resource parameters, including the participant preferences 300, 306, the sponsorship availability 308, and the sponsorship indication 310, and the costs 312, being predetermined values. The available potential participants 26 and their indicated topics of interest have been combined by the talk radio program service 12 to dynamically schedule three distinct talk radio programs 320, each having its own assigned topic 302, potential listeners 26a, potential host(s) 26b, potential guest(s) 26c, and potential advertiser 26d.

In one embodiment, the talk radio program service 12 may be implemented within a radio station that schedules, produces and plays the talk radio programs 320. In another embodiment, the talk radio program service 12 may only provide the scheduled talk radio programs 320 to third-party radio stations, which then produce and play the talk radio programs. In one embodiment, the talk radio programs dynamically scheduled by the talk radio program service 12 may be used to schedule not only Internet radio programs, but also terrestrial radio programs. Internet talk radio programs may be used by an Internet radio station, a satellite radio station or a multicast or a unicast internet broadcaster that provide the talk radio programs over the Internet. In this embodiment, the scheduled talk radio programs may be streamed across the Internet during production and played by an electronic device in real-time (e.g., Internet radio streams or webcasts). In another embodiment, the talk radio programs may be recorded and stored as an audio file that is downloaded to the electronic device and played (e.g., podcasts) after production.

Figure 4:
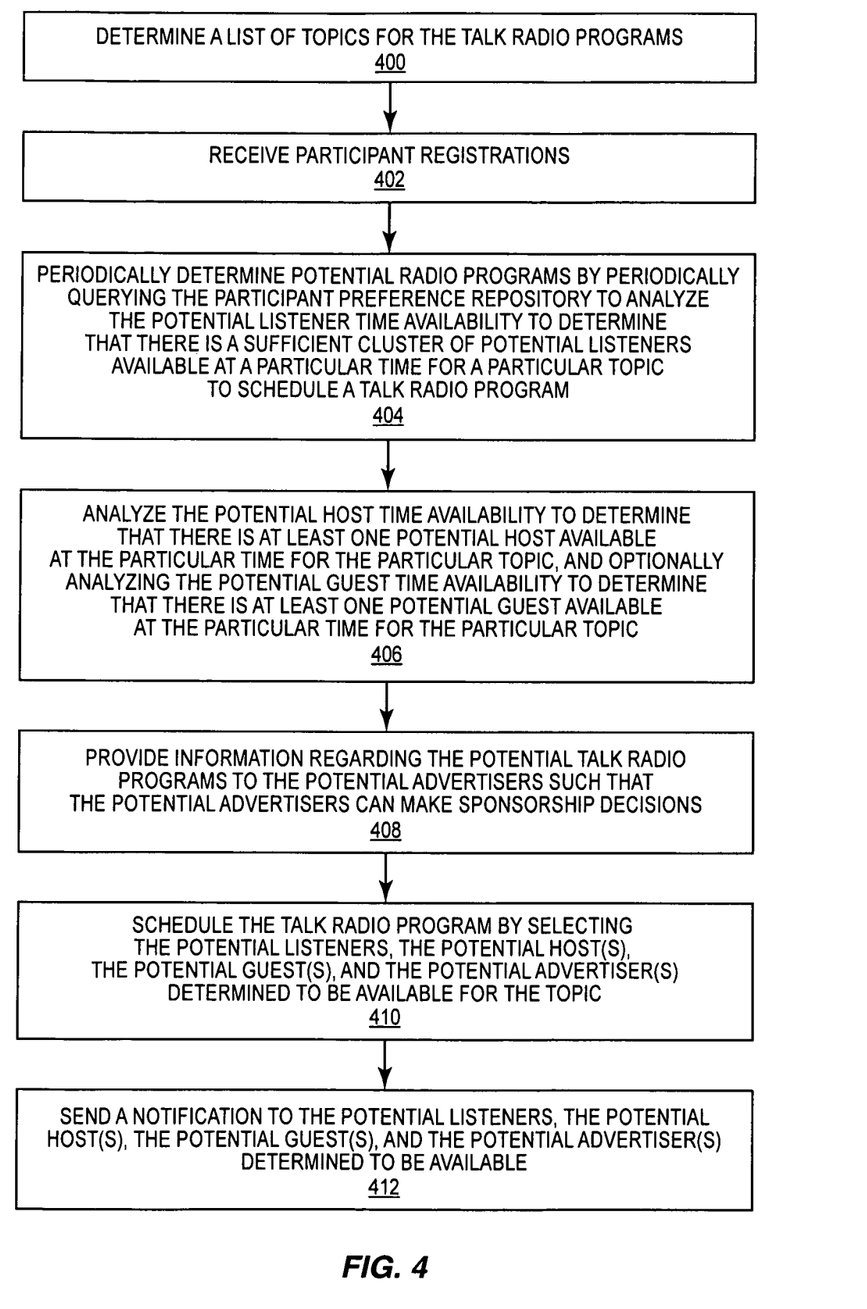
FIG. 4 is a flow diagram illustrating a process for scheduling a talk radio program in further detail according to one exemplary embodiment.

FIG. 4 is a flow diagram illustrating a process for scheduling a talk radio program in further detail according to one exemplary embodiment. It should be noted that the blocks/steps described herein may be implemented in a different order(s) and remain within the scope of the exemplary embodiment.

In one embodiment, the radio program process 24 determines a list of topics for the talk radio programs (block 400). The radio program process 24 may determine the list of topics from a variety of sources. In one embodiment, the radio program process 24 may determine a list of topics from user interest. As the potential participants 26 register for the talk radio program service 12, the potential participants 26 may specify topics of interest. After a particular volume of potential participants 26 specifies the same or similar topic, the radio program process 24 may select the topic for inclusion into the list of topics eligible for selection. In one embodiment, the list of topics may be chosen only from the topics of interest specified by the potential listeners 26a. In another embodiment, the lists of topics may be chosen only from the topics of interest specified by the potential guests 26c and/or potential advertisers 26d. In another embodiment, the list of topics may contain all of the topics entered by all of the potential participants 26.

In another embodiment, the radio program process 24 may determine the list of topics from current events by automatically scanning a news aggregation service, such as Google News, and selecting those topics of high interest. In another embodiment, the list of topics may be determined for the radio program process 24 manually by service operators.

The radio program process 24 receives participant registrations (block 402). In one embodiment, the radio program process 24 performs the participant registration on an as needed basis when requested by a client device 14. In another embodiment, the radio program process 24 may have a set time for participant registration.

Figure 5:
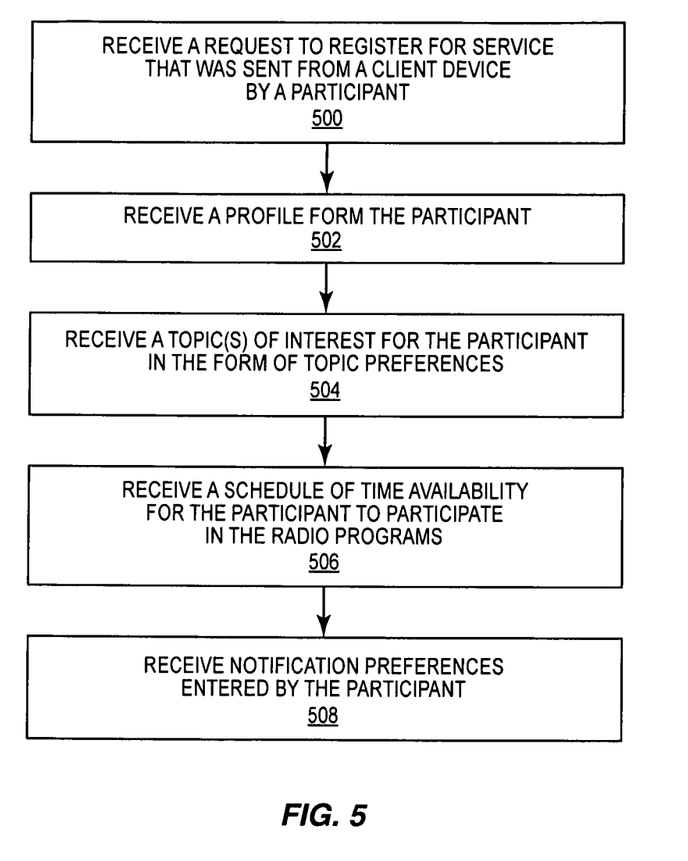
FIG. 5 is a flow diagram illustrating the registration process.

FIG. 5 is a flow diagram illustrating the registration process. It should be noted that the blocks/steps described herein may be implemented in a different order(s) and remain within the scope of the exemplary embodiment. The registration process may include the radio program process 24 receiving a request to register for service sent from a client device 14 by a potential participant 26 (block 500). The radio program process 24 may receive a profile from the participant (block 502). In one embodiment, the profile may include, but is not limited to, contact information of the participant, and the fee 305 in the case where the participant is a potential host 26b or a potential guest 26c.

The radio program process 24 may receive a topic(s) of interest for the potential participant 26 in the form of topic preferences (block 504). In the embodiment where the radio program process 24 determines the list of topics for the talk radio programs, the radio program process 24 may provide the list of topics to the client device 14 for display and selection by the potential participant 26.

The radio program process 24 may receive a schedule of time availability for the potential participant 26 to participate in the radio program(s) (block 506). The radio program process 24 may also receive notification preferences entered by the potential participant 26 (block 508). The notification preferences may specify what devices and/or applications are to receive the notifications and any necessary contact information (e.g., cell phone number for text messages).

In one embodiment, the time availability of the potential participant 26 may be specified as a schedule of one of more time availabilities generally. In another embodiment, the time availability of the participant may be specified as a schedule of one of more time availabilities that are mapped to specific topics of interest, as shown in Table I:

TABLE I

| Topic | Time |
|---|---|
| Miami Dolphins | Any Time |
| Boston Celtics | 15:00-19:00, MWF |
| Gas Prices | 07:00-09:00, MTWTF |

As shown in Table I, during the registration process, the potential participants 26 including the potential listeners 26a, the potential hosts 26b, the potential guests 26c, and the potential advertisers 26d may specify topics of interest and for each topic schedule a time availability to participate in the talk radio program(s). As described above, however, the potential hosts 26b, and the potential guests 26c also may specify their desired fee 305. The radio program process 24 may store the profile and the participant preferences of each registrant in the participant preference repository 20. The costs or price offered by the potential advertiser(s) 26d to sponsor the talk radio program(s) may also be stored in the participant preference repository 20 in one embodiment.

Referring again to FIG. 4, either during or after the participant registration process, the radio program process 24 periodically determines potential radio programs by periodically querying the participant preference repository 20 to analyze the potential listener time availability to determine that there is a sufficient cluster of potential listeners 26a available at a particular time for a particular topic to schedule a talk radio program (block 404). In one embodiment, this determination may be performed by comparing the number of the potential listeners 26a available for a particular topic to a predetermined threshold. In another embodiment, the determination may be cost based.

By way of example, consider a situation where the talk radio program service 12 offers radio programs on the half-hour. For each topic found in the participant preference repository 20, the radio program process 24 may determine if the total number of potential listeners 26a interested in the topic and available during that time period is greater than a predetermined threshold (e.g., a sufficient number to recover operational costs based on expected advertising revenue).

Figure 6:
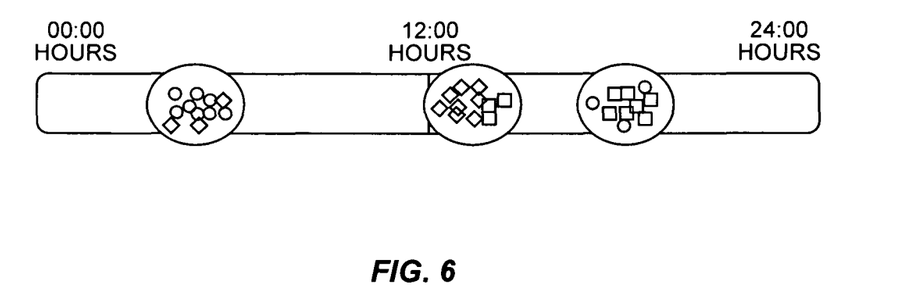
FIG. 6 is diagram graphically illustrating an example density of registered participants over a 24-hour period based on three topics of interest.

FIG. 6 is diagram graphically illustrating an example density of registered participants over a 24-hour period based on three topics of interest. In this example, the circles may represent potential participants 26 that submitted "Miami Dolphins" as a topic of interest and a time availability between 00:00 hours and 24:00 hours. The triangles may represent potential participants 26 that submitted "Tiger Woods" as a topic of interest and a time availability between 00:00 hours and just after 12:00 hours. And the squares may represent potential participants 26 that submitted "Celtics" as a topic of interest and a time availability between 12:00 hours and 24:00 hours. Based on this information, which may be stored in the participant preference repository 20, the radio program process 24 has identified three time periods that have sufficient participant density associated with three topics to justify the scheduling of three talk radio programs.

Referring again to FIG. 4, besides analyzing potential listener time availability, the radio program process 24 may also analyze the potential host time availability to determine that there is at least one potential hosts 26b available at the particular time for the particular topic, and optionally analyzing the potential guest time availability to determine that there is at least one potential guests 26c available at the particular time for the particular topic (block 406). The radio program process 24 may take into consideration the amount of any specified hosts/guest fee 305 when making this determination.

Once elements of each of the potential talk radio programs have been identified, including the potential listeners 26a, a potential host 26b, and the potential guests 26c, information regarding the potential talk radio programs is provided to the potential advertisers 26d such that the potential advertisers 26d can make sponsorship decisions (block 408). Using the resource parameters, including the fee 305, the radio program process 24 may be configured to set a minimum fee to cover the fees 305, service overhead and service fees, which may be included with the information made available to the potential advertisers 26d. The information may be provided to the potential advertisers 26d electronically, verbally, or by hardcopy.

Table II is an example of the information provided to potential advertisers 26d as a potential talk radio program offer.

TABLE II

| Sponsor Fee | Topic | Host | Guests | Potential listeners |
|---|---|---|---|---|
| $1765 | 72 Dolphins | Big Al | Don Shula | 15,675 |
| $300 | Objective-C | Richard Walsh | Brad Cox | 57 |
| $2500 | Obama | Greg Evans | John Edwards | 20,058 |

The potential advertisers 26d may select to sponsor one or more potential talk radio programs based on information in the program offer. Other information also may be provided to the potential advertisers 26d to complete the program offer such as potential listener demographics, radio program length, and host and guest profile information.

In one embodiment, the potential advertisers 26d decision to sponsor a given talk radio program may be provided to the radio program process 24 by logging into the talk radio program service 12 and updating the sponsorship indication 310 in the advertiser participant preference 306 (FIG. 3).

Referring still to FIG. 4, once all the elements for a particular potential talk radio program are in place, the radio program process 24 schedules the talk radio program by selecting the potential listeners 26a, the potential host(s) 26b, the potential guest(s) 26c, and the potential advertiser(s) 26d determined to be available for the topic (block 410). In one embodiment, the selected elements of the scheduled talk radio program may be stored in the radio program repository 22.

The program process 26 also sends a notification of the scheduling of the talk reader program to the potential listeners 26a, the potential host(s) 26b, the potential guest(s) 26c, and the potential advertiser(s) 26d determined to be available for the topic (block 412). In one embodiment, the notification may be sent via a number of mechanisms, including a short messaging service (SMS), an e-mail, a voicemail, and an in-application notification, and the like.

In one embodiment, the notification may contain program details, program times, a program score, sponsor information, and an URL to the program stream of an Internet talk radio program. In one embodiment, the program score for a particular participant may be calculated based on how specifically the radio program process 24 matches the participant's preferences, e.g., specified topics of interest. In some cases, a topic assigned to a radio program may not match exactly with the participant's specified topic of interest, but the radio program process 24 may determine that the topic assigned to a radio program matches the participant's indicated topic of interest within a predetermined threshold, i.e., when the topics are "sufficiently related". For example, suppose a potential participant expressed interest in the '72 Miami Dolphins. A talk radio program discussing the '72 Miami Dolphins may be scored for that participant higher than a talk radio program discussing "Dan Marino", but the participant may be notified of both talk radio programs because the topics are closely related by subject matter—Dan Marino being a well-known quarterback of the Miami Dolphins.

A method and system for dynamic talk radio program scheduling has been disclosed. The talk radio program method and system is flexible and may support a variety of alternative embodiments. For example, in one alternative embodiment, the talk radio program may be scheduled via an auction model, where potential hosts 26b, potential guests 26c, and/or potential advertisers 26d may submit bids to the talk radio program service 12 to participate in the potential talk radio programs regarding topics preselected by the talk radio program service 12.

In another alternative embodiment, the talk radio program may be scheduled via an advertiser driven model whereby the potential advertisers 26d may set any of a price, topics of interest, the minimum number of potential users 26a, preferred hosts, and the like, to drive scheduled of the radio program.

In yet another alternative embodiment, talk radio program service may support an infomercial hybrid model. In this embodiment, a potential advertiser 26d may supply a "big name" guest and a contract to potential hosts of a talk radio program. During the talk radio program, the guest directly pitches the advertiser's product to the listeners. For example, Chuck Norris may be a guest on a talk radio program with a selection of pre-scripted talking points on a "Total Gym" product. There may be a base price paid by the talk show host to the advertiser per minute for Chuck's time on the show. "Total Gym" may then credit the talk show host on a per listener minute accumulated. Chuck may be directly compensated by "Total Gym" for his time on the show. This could be considered a hybrid of an infomercial and more of traditional talk radio to a narrow casted listener base. Since the host and the potential listeners qualify the existence of the talk radio program, per listener minute advertisement value may be significantly higher than in a traditional infomercial.

In yet another embodiment, scheduling of the radio program may be based on the potential host(s) 26b. In this embodiment, potential host(s) 26b specifies criteria, i.e., resource parameters, and the talk radio program service 12 schedules a radio program whenever the specified resource parameters are met. For example, the potential host(s) 26b may specify a willingness to host a radio program if two or more potential listeners are obtained to discuss topic "x". In this embodiment, the talk radio program service 12 is created to serve the "long tail" in that it would provide the infrastructure, audience, etc. for Internet radio programs that are very targeted (i.e., a small number of participants).

The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM and is to be executed by a processor. Accordingly, many modifications may be made by one of ordinary skill in the art without departing from the spirit and scope of the appended claims.

We claim:

1. A method performed via a server computer, comprising:
registering potential participants of a talk radio program service via the server computer;
receiving participant preferences for each of the potential participants via the server computer, wherein the participant preferences include at least one topic of interest and a time availability;
scheduling a talk radio program for production via the server computer when a combination of the participant preferences reach predetermined thresholds; and
sending the potential participants a notification of the scheduling of the talk radio program via the server computer.

2. The method of claim 1 wherein the potential participants include participants selected from a group comprising at least one of potential listeners of the talk radio program, potential hosts, potential guests, and potential advertisers.

3. The method of claim 2 wherein the participant preferences further include the time availability of any of the potential listeners, the potential hosts, the potential guests, and the potential advertisers.

4. The method of claim 3 further comprising assigning the topic of interest to the talk radio program based on availability of any of the potential listeners, the potential hosts, the potential guests, and the potential advertisers.

5. The method of claim 2 further comprising scheduling the talk radio program for production when resource parameters comprise one or more predetermined values.

6. The method of claim 5 wherein the resource parameters include the participant preferences and at least one of advertisement revenue generated from sponsorship by at least one of the potential advertisers, and costs of the talk radio program.

7. The method of claim 2 further comprising receiving for each of the potential hosts and the potential guests a desired fee for participating in the talk radio program.

8. The method of claim 2 providing information regarding the talk radio program to the potential advertisers such that the potential advertisers can make sponsorship decisions.

9. The method of claim 2 further comprising receiving from at least one of the potential hosts, the potential guests, and the potential advertisers, a bid to participate in a potential talk radio program regarding a preselected topic.

10. The method of claim 1 further comprising sending the notification via at least one of a short messaging service (SMS), an e-mail, a voicemail, and an in-application notification.

11. The method of claim 1 further comprising sending information with the notification including any of program details, program times, a program score, sponsor information, and an URL to a program stream of an Internet talk radio program.

12. The method of claim 1 wherein the talk radio program comprises one of an Internet talk radio program and a terrestrial talk radio program.

13. A system, comprising:
a server;
a radio program process executing on the server that functions to:
register potential participants of a talk radio program service and receive participant preferences for each of the potential participants, wherein the participant preferences include at least one topic of interest and a time availability;
schedule a talk radio program for production when a combination the participant preferences reach predetermined thresholds; and
send the potential participants a notification of the scheduling of the talk radio program.

14. The system of claim 13 wherein the potential participants include participants selected from a group comprising at least one of potential listeners of the talk radio program, potential hosts, potential guests, and potential advertisers.

15. The system of claim 14 wherein the participant preferences further include the time availability of any of the potential listeners, the potential hosts, the potential guests, and the potential advertisers.

16. The system of claim 14 wherein the radio program process assigns the talk radio program the topic of interest based on availability of any of the potential listeners, the potential hosts, the potential guests, and the potential advertisers.

17. The system of claim 14 wherein the radio program process schedules the talk radio program for production when resource parameters comprise one or more predetermined values.

18. The system of claim 17 wherein the resource parameters include the participant preferences and at least one of advertisement revenue generated from sponsorship by at least one of the potential advertisers, and costs of the talk radio program.

19. The system of claim 14 wherein the radio program process receives for each of the potential hosts and the potential guests a desired fee for participating in the talk radio program.

20. The system of claim 14 wherein information regarding the talk radio program is provided to the potential advertisers such that the potential advertisers can make sponsorship decisions.

21. The system of claim 14 wherein the radio program process receives from at least one of the potential hosts, the potential guests, and the potential advertisers, a bid to participate in a potential talk radio program regarding a preselected topic.

22. The system of claim 13 wherein the radio program process sends the notification via at least one of a short messaging service (SMS), an e-mail, a voicemail, and an in application notification.

23. The system of claim 13 wherein the radio program process sends information with the notification including any of program details, program times, a program score, sponsor information, and an URL to a program stream of an Internet talk radio program.

24. The system of claim 13 wherein the talk radio program comprises one of an Internet talk radio program and a terrestrial talk radio program.

25. An executable software product stored on a computer-readable medium containing program instructions for scheduling a talk radio program, the instructions comprising:
registering potential participants of a talk radio program service at a server computer;
receiving participant preferences for each of the potential participants via the server computer, wherein the participant preferences include at least one topic of interest and a time availability;
scheduling the talk radio program for production via the server computer when a combination of the participant preferences reach predetermined thresholds; and
sending the potential participants a notification of the scheduling of the talk radio program via the server computer.

26. A method for providing a talk radio service via a server computer, comprising:

registering potential listeners via the server computer and receiving for each of the potential listeners, a first topic of interest and a potential listener time availability;

registering potential hosts via the server computer and receiving for each of the potential hosts, a second topic of interest and a potential host time availability;

periodically analyzing the potential listener time availability via the server computer to determine that there is a sufficient cluster of the potential listeners available at a particular time for a particular topic to schedule a talk radio program, and analyzing the potential host time availability to determine that at least one of the potential hosts is available at the particular time for the particular topic;

scheduling the talk radio program for production via the server computer by selecting the potential listeners and anyone of the potential hosts determined to be available for the particular topic; and sending to the potential listeners and to anyone of the potential hosts determined to be available for the particular topic a notification of the scheduling of the talk radio program via the server computer.

27. The method of claim 26 further comprising providing information regarding the talk radio program to potential advertisers such that the potential advertisers can make sponsorship decisions for the talk radio program.

28. The method of claim 26 further comprising:

registering potential guests and receiving for each of the potential guests, a third topic of interest and a potential guest time availability;

analyzing the potential just time availability to determine that at least one of the potential guests is available at the particular time for the particular topic;

scheduling the talk radio program by selecting the potential listeners, any of the potential hosts, and any of the potential guests determined to be available for the particular topic; and sending to the potential listeners, to any of the potential hosts, and to any of the potential guests determined to be available for the particular topic the notification of the scheduling of the talk radio program.

* * * * *